(12) United States Patent
Ryu et al.

(10) Patent No.: US 11,402,518 B2
(45) Date of Patent: Aug. 2, 2022

(54) RADIATION IMAGING APPARATUS

(71) Applicant: CANON KABUSHIKI KAISHA, Tokyo (JP)

(72) Inventors: Takuya Ryu, Tokyo (JP); Kentaro Fujiyoshi, Tokyo (JP); Ryosuke Miura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/364,179

(22) Filed: Jun. 30, 2021

(65) Prior Publication Data
US 2022/0011452 A1    Jan. 13, 2022

(30) Foreign Application Priority Data
Jul. 8, 2020    (JP) .............................. JP2020-117931

(51) Int. Cl.
*H04N 5/367*    (2011.01)
*G01T 1/20*    (2006.01)

(52) U.S. Cl.
CPC ......... *G01T 1/20184* (2020.05); *H04N 5/367* (2013.01)

(58) Field of Classification Search
CPC ...... H04N 5/367; H04N 5/361; H04N 5/3651; H04N 5/36963; H04N 5/32; G01T 1/20184
See application file for complete search history.

(56) References Cited

U.S. PATENT DOCUMENTS

| | | |
|---|---|---|
| 8,878,972 B2 | 11/2014 | Wayama et al. |
| 9,128,196 B2 | 9/2015 | Sato et al. |
| 9,270,903 B2 | 2/2016 | Wayama et al. |
| 9,277,896 B2 | 3/2016 | Ofuji et al. |
| 9,423,512 B2 | 8/2016 | Sato et al. |
| 9,423,513 B2 | 8/2016 | Watanabe et al. |
| 9,445,030 B2 | 9/2016 | Yagi et al. |
| 9,462,989 B2 | 10/2016 | Takenaka et al. |
| 9,468,414 B2 | 10/2016 | Ryu et al. |
| 9,470,800 B2 | 10/2016 | Iwashita et al. |
| 9,470,802 B2 | 10/2016 | Okada et al. |
| 9,521,347 B2 | 12/2016 | Kawanabe et al. |
| 9,541,653 B2 | 1/2017 | Iwashita et al. |
| 9,625,585 B1 | 4/2017 | Yokoyama et al. |
| 9,726,767 B2 | 4/2017 | Kawanabe et al. |

(Continued)

FOREIGN PATENT DOCUMENTS

JP    2016-220116 A    12/2016

*Primary Examiner* — Nelson D. Hernández Hernández
(74) *Attorney, Agent, or Firm* — Venable LLP

(57) ABSTRACT

A radiation imaging apparatus includes pixels arranged to form pixel rows and pixel columns. The pixels include first pixels and second pixels whose sensitivity to radiation is lower than the first pixels. The apparatus further includes a signal lines arranged to correspond to the pixel columns, a readout circuit configured to read out a signal from the pixels via the signal lines, and a processing unit configured to decide a correction value using signals read out from the second pixels and correct signals read out from the first pixels using the correction value. An internal structure of the readout circuit has a period. The second pixels are arranged such that there are two or more types of remainders of column numbers of pixel columns that include the second pixels divided by the period.

10 Claims, 8 Drawing Sheets

(56) References Cited

U.S. PATENT DOCUMENTS

| | | |
|---|---|---|
| 9,655,586 B2 | 5/2017 | Yagi et al. |
| 9,661,240 B2 | 5/2017 | Fujiyoshi et al. |
| 9,675,307 B2 | 6/2017 | Ofuji et al. |
| 9,737,271 B2 | 8/2017 | Iwashita et al. |
| 9,812,474 B2 | 11/2017 | Yagi et al. |
| 9,835,732 B2 | 12/2017 | Fujiyoshi et al. |
| 9,838,638 B2 | 12/2017 | Furumoto et al. |
| 9,948,871 B2 | 4/2018 | Wayama et al. |
| 9,971,046 B2 | 5/2018 | Ryu et al. |
| 9,977,135 B2 | 5/2018 | Yokoyama et al. |
| 9,980,685 B2 | 5/2018 | Iwashita et al. |
| 9,989,656 B2 | 6/2018 | Sato et al. |
| 10,068,943 B2 | 9/2018 | Fujiyoshi et al. |
| 10,349,914 B2 | 7/2019 | Takenaka et al. |
| 10,416,323 B2 | 9/2019 | Ryu et al. |
| 10,473,801 B2 | 11/2019 | Kawanabe et al. |
| 10,537,295 B2 | 1/2020 | Watanabe et al. |
| 10,551,721 B2 | 2/2020 | Sato et al. |
| 10,634,800 B2 | 4/2020 | Yokoyama et al. |
| 10,716,522 B2 | 7/2020 | Sato et al. |
| 10,914,849 B2 | 2/2021 | Ofuji et al. |
| 11,067,706 B2 | 7/2021 | Furumoto et al. |
| 11,083,430 B2 | 8/2021 | Sato et al. |
| 11,090,018 B2 | 8/2021 | Watanabe et al. |
| 2013/0342514 A1 | 12/2013 | Yokoyama et al. |
| 2014/0154833 A1 | 6/2014 | Wayama et al. |
| 2014/0239186 A1 | 8/2014 | Sato et al. |
| 2014/0361189 A1 | 12/2014 | Kameshima et al. |
| 2018/0055464 A1 | 3/2018 | Watanabe |
| 2018/0063933 A1 | 3/2018 | Okada et al. |
| 2019/0038250 A1* | 2/2019 | Takenaka ............ A61B 6/542 |
| 2019/0094394 A1* | 3/2019 | Matsumoto ......... H04N 5/3559 |
| 2019/0391629 A1 | 12/2019 | Yokoyama et al. |
| 2020/0124749 A1 | 4/2020 | Takenaka et al. |
| 2020/0166659 A1 | 5/2020 | Fujiyoshi et al. |
| 2020/0348424 A1 | 11/2020 | Watanabe et al. |
| 2020/0371259 A1 | 11/2020 | Miura et al. |

* cited by examiner

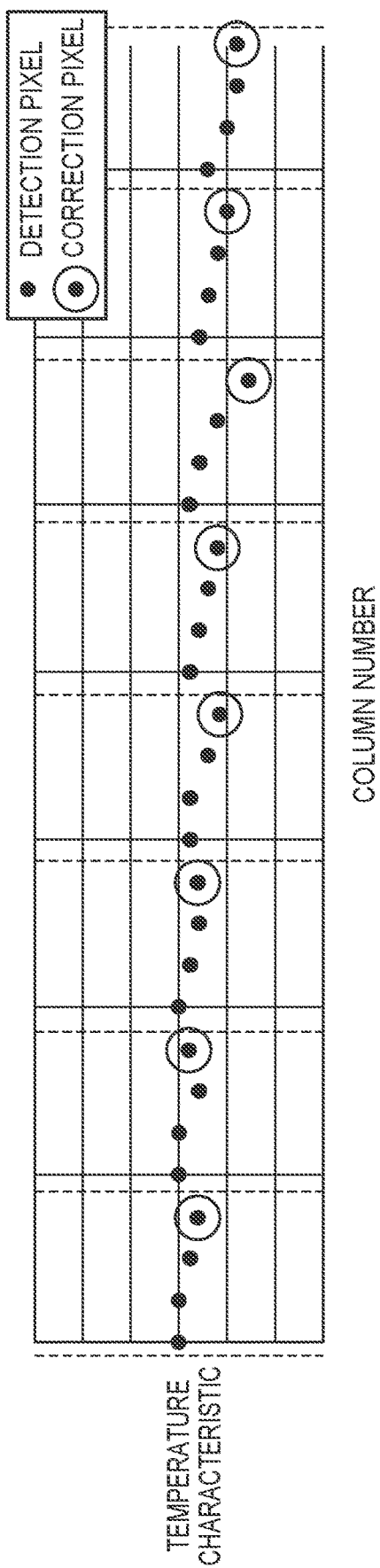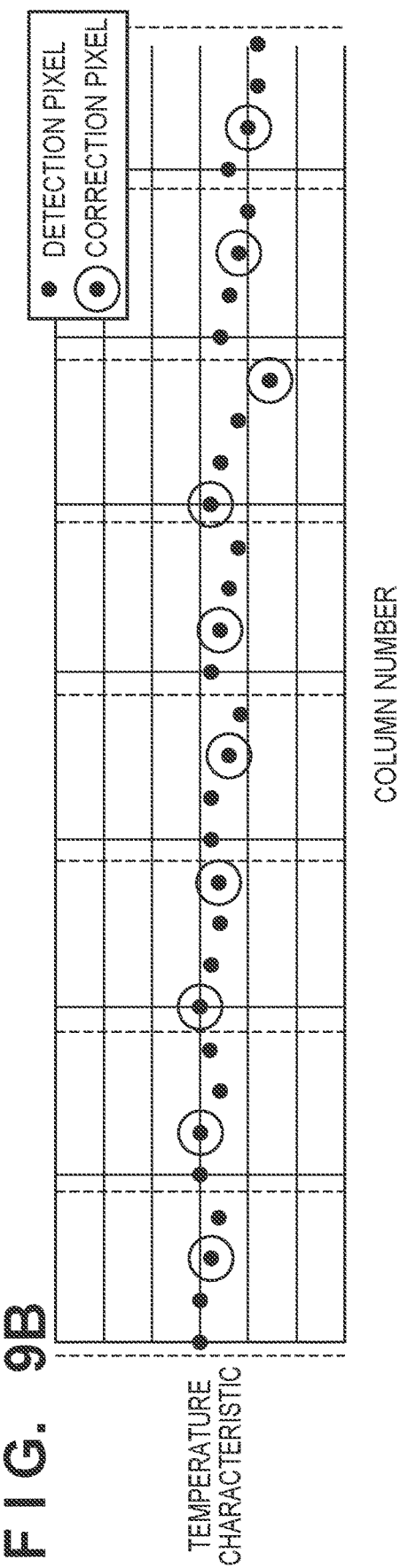

RADIATION IMAGING APPARATUS

BACKGROUND OF THE INVENTION

Field of the Invention

The present disclosure relates to a radiation imaging apparatus.

Description of the Related Art

In medical imaging diagnosis or non-destructive inspection, radiation imaging apparatuses that use a flat plane detector (a flat panel detector, FPD) formed with a semiconductor material are widely used. In such radiation imaging apparatuses, it is known to monitor radiation incident on the radiation imaging apparatus. Japanese Patent Laid-Open No. 2016-220116 discloses recognizing an integrated dose of radiation that is incident during radiation irradiation by detecting a radiation dose in real time and performing automatic exposure control (AEC). The radiation imaging apparatus of this literature has imaging pixels for acquiring radiation signals and correction pixels for acquiring correction signals. The radiation imaging apparatus acquires the correction signals in advance and, using these, corrects the radiation signals. The correction signals are averaged across a plurality of pixel columns in order to reduce noise. There are cases where the characteristics of a readout circuit change in the duration between when the correction signals are read out and when the radiation signals are read out due to, for example, a temperature change in the radiation imaging apparatus. This change in characteristics may have a spatial periodicity due to an internal structure of the readout circuit.

SUMMARY OF THE INVENTION

The inventors discovered that the accuracy of correction of radiation signals is different depending on the position of correction pixels. One aspect of the present disclosure provides a technique for accurately correcting radiation signals.

According to an embodiment, a radiation imaging apparatus is provided. The apparatus includes a plurality of pixels arranged to form a plurality of pixel rows and a plurality of pixel columns. The plurality of pixels including a plurality of first pixels and a plurality of second pixels whose sensitivity to radiation is lower than the plurality of first pixels. The apparatus further includes a plurality of signal lines arranged to correspond to the plurality of pixel columns, a readout circuit configured to read out a signal from the plurality of pixels via the plurality of signal lines, and a processing unit configured to decide a correction value using a plurality of signals read out from the plurality of second pixels and correct a plurality of signals read out from the plurality of first pixels using the correction value. An internal structure of the readout circuit has a period. The plurality of second pixels are arranged such that there are two or more types of remainders of column numbers of pixel columns that include the plurality of second pixels divided by the period.

Further features of the present invention will become apparent from the following description of exemplary embodiments (with reference to the attached drawings).

BRIEF DESCRIPTION OF THE DRAWINGS

FIGS. 9A and 9B are views illustrating periodic changes in a characteristic of a readout circuit of the embodiment of the present disclosure.

DESCRIPTION OF THE EMBODIMENTS

Figure 1:
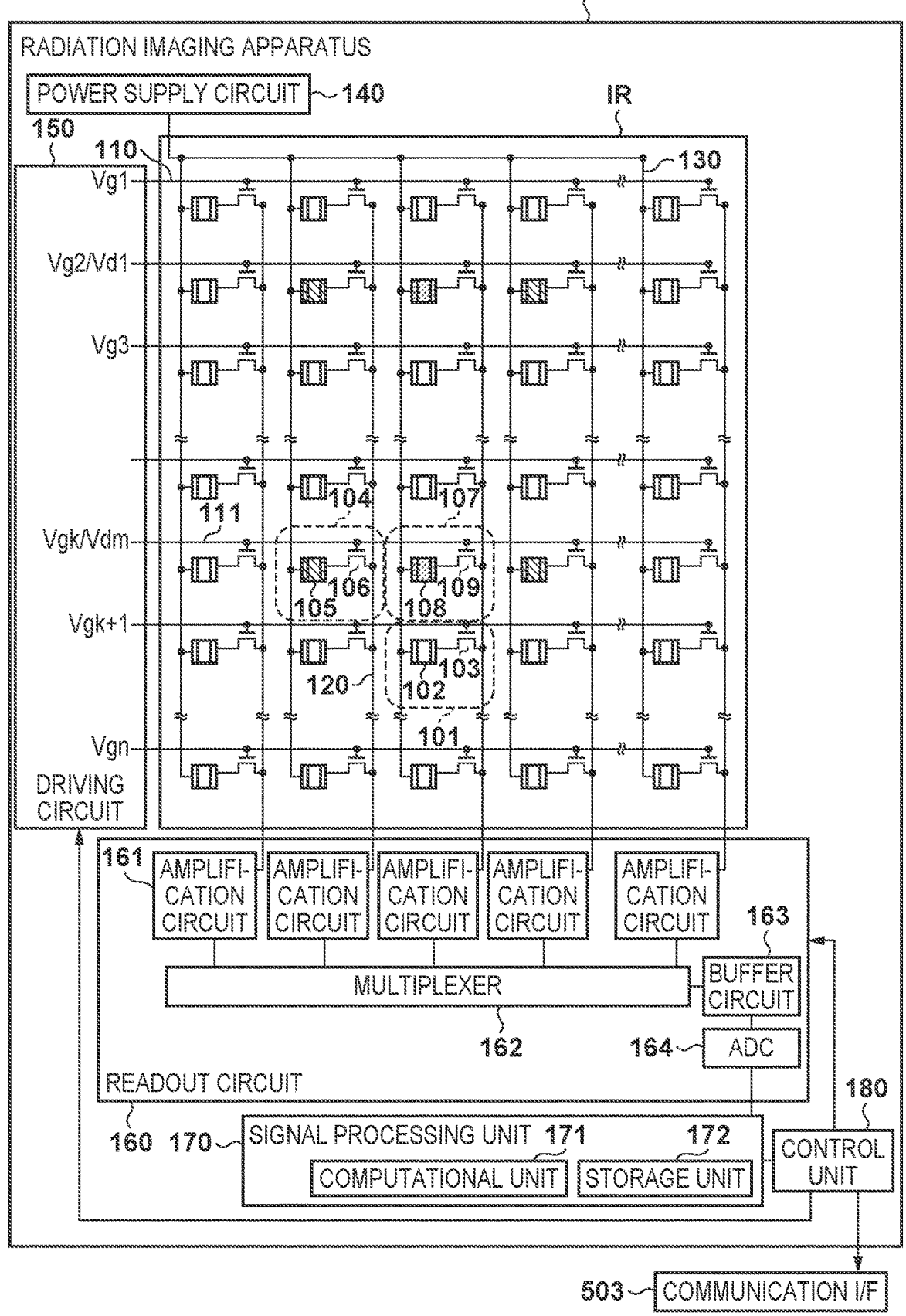
FIG. 1 is a view illustrating a configuration of a radiation imaging apparatus of an embodiment of the present disclosure.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 illustrates an example of a configuration of a radiation imaging apparatus 100 according to some embodiments of the present disclosure. The radiation imaging apparatus 100 has a plurality of pixels arranged in an imaging region IR so as to form a plurality of pixel rows and a plurality of pixel columns, a plurality of driving lines 110, and a plurality of signal lines 120. The plurality of driving lines 110 are arranged to correspond to the plurality of pixel rows, and each driving line 110 corresponds to any one pixel row. The plurality of signal lines 120 are arranged to correspond to the plurality of pixel columns, and each signal line 120 corresponds to any one pixel column.

The plurality of pixels include a plurality of imaging pixels 101 used for acquiring a radiation image, a plurality of detection pixels 104 used for monitoring the radiation irradiation dose, and a plurality of correction pixels 107 used for correcting the radiation irradiation dose. The sensitivity of the correction pixels 107 to radiation is lower than the sensitivity of the detection pixels 104 to radiation.

The imaging pixel 101 includes a conversion element 102 for converting radiation to an electrical signal and a switch element 103 for connecting a corresponding signal line 120 and the conversion element 102 to each other. The detection pixel 104 includes a conversion element 105 for converting radiation to an electrical signal and a switch element 106 for connecting a corresponding signal line 120 and the conversion element 105 to each other. The detection pixels 104 are arranged to be included in the rows and columns formed by the plurality of imaging pixels 101. The correction pixel 107 includes a conversion element 108 for converting radiation to an electrical signal and a switch element 109 for a connecting the signal line 120 and the conversion element 108 to each other. The correction pixels 107 are arranged to be included in the rows and columns formed by the plurality of imaging pixels 101. In FIG. 1 and the subsequent drawings, the imaging pixels 101, the detection pixels 104, and the correction pixels 107 are differentiated by adding different hatching to the conversion elements 102, the conversion elements 105, and the conversion elements 108.

The conversion elements 102, the conversion elements 105, and the conversion elements 108 may be configured by a scintillator for converting radiation to light and photoelectric conversion elements for converting light to electric signals. A scintillator is generally formed in a sheet form so as to cover the imaging region IR and is shared by a plurality of pixels. Alternatively, the conversion elements 102, the conversion elements 105, and the conversion elements 108 may be formed by conversion elements for directly converting radiation to electrical signals.

The switch elements 103, the switch elements 106, and the switch elements 109 may include, for example, a thin-film transistor (TFT) whose active region is configured by a semiconductor such as amorphous silicon or polycrystalline silicon.

The first electrode of the conversion element 102 is connected to the first main electrode of the switch element 103, and the second electrode of the conversion element 102 is connected to a bias line 130. One bias line 130 extends in the column direction and is commonly connected to the second electrodes of the plurality of conversion elements 102 arranged in the column direction. The bias lines 130 receive a bias voltage Vs from a power supply circuit 140. The second main electrode of the switch element 103 of one or more imaging pixels 101 included in one column is connected to one signal line 120. The control electrode of the switch element 103 of one or more imaging pixels 101 included in one row is connected to one driving line 110.

The detection pixels 104 and the correction pixels 107 also have the same pixel configuration as the imaging pixels 101 and are connected to the corresponding driving lines 110 and the corresponding signal lines 120. The detection pixels 104 and the correction pixels 107 are exclusively connected to the signal lines 120. In other words, the correction pixels 107 are not connected to the signal lines 120 to which the detection pixels 104 are connected. Also, the detection pixels 104 are not connected to the signal lines 120 to which the correction pixels 107 are connected. The imaging pixels 101 may be connected to the same signal lines 120 as the detection pixels 104 or the correction pixels 107.

A driving circuit 150 is configured to supply a driving signal to pixels to be driven via the plurality of driving lines 110 in accordance with a control signal from a control unit 180. In the present embodiment, a driving signal is a signal for turning on the switch elements that are included in the pixels to be driven. The switch element of each pixel is turned on by a high-level signal and turned off by a low-level signal. Accordingly, the high-level signals are referred to as the driving signals. By the driving signals being supplied to the pixels, a state in which it is possible for a readout circuit 160 to read out the signals accumulated in the conversion elements of these pixels is entered. When the driving line 110 is connected to at least one of the detection pixel 104 and the correction pixel 107, the driving line 110 is referred to as a detection driving line 111.

The readout circuit 160 is configured to read out signals from the plurality of pixels via the plurality of signal lines 120. The readout circuit 160 includes a plurality of amplification circuits 161, one or more multiplexers 162, a buffer amplifier 163, and an analog/digital converter (hereinafter, AD converter) 164. Each of the plurality of signal lines 120 is connected to a corresponding amplification circuit 161 among the plurality of amplification circuits 161 of the readout circuit 160. One signal line 120 corresponds to one amplification circuit 161. The amplification circuits 161 amplify signals from the signal lines 120 and supply their outputs to a multiplexer 162. The multiplexer 162 selects the plurality of amplification circuits 161 in a predetermined order and supplies the signal of the selected amplification circuit 161 to the buffer amplifier 163. The buffer amplifier 163 performs impedance conversion on the signal that was supplied from the multiplexer 162 and supplies the analog signal to an AD converter 164. The AD converter 164 converts the supplied analog signal to a digital signal and then outputs the result.

The signals read out from the imaging pixels 101 are supplied to a signal processing unit 170, and processing such as computation and storage are performed by the signal processing unit 170. More specifically, the signal processing unit 170 includes a computational unit 171 and a storage unit 172, and the computational unit 171 generates a radiation image based on the signals read out from the imaging pixels 101 and supplies it to the control unit 180. The signal processing unit 170, the computational unit 171, and the storage unit 172 may be a signal processing circuit, a computational circuit, and a storage circuit, respectively. The signals read out from the detection pixels 104 and the correction pixels 107 are supplied to the signal processing unit 170, and processing such as computation and storage are performed by the computational unit 171. More specifically, the signal processing unit 170 outputs information that indicates radiation irradiation on the radiation imaging apparatus 100 based on the signals read out from the detection pixels 104 and the correction pixels 107. For example, the signal processing unit 170 detects radiation irradiation on the radiation imaging apparatus 100 and decides the radiation irradiation dose and/or the integrated irradiation dose.

The control unit 180 controls the driving circuit 150 and the readout circuit 160 based on the information from the signal processing unit 170. The control unit 180 may be a control circuit. The control unit 180 controls, for example, a start and an end of exposure (an accumulation of charge, which corresponds to irradiated radiation, by the imaging pixels 101) based on the information from the signal processing unit 170.

In order to decide the radiation irradiation dose, the control unit 180, by controlling the driving circuit 150, scans only the detection driving lines 111 and causes a state in which it is possible to read out only the signals from the detection pixels 104 and the correction pixels 107. Next, the control unit 180, by controlling the readout circuit 160, reads out the signals of pixel columns that correspond to the detection pixels 104 and the correction pixels 107 and then outputs these as information that indicates the radiation irradiation dose. By such an operation, the radiation imaging apparatus 100 can obtain irradiation information in the detection pixels 104 during radiation irradiation.

Figure 2:
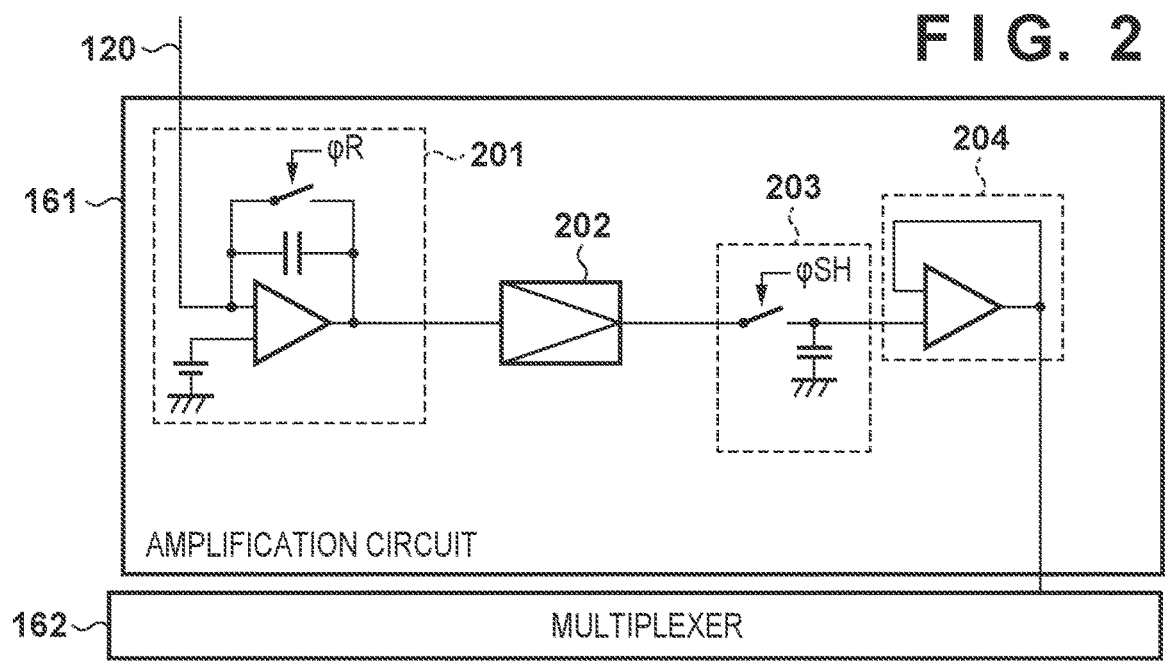
FIG. 2 is a view illustrating a configuration of an amplification circuit of the embodiment of the present disclosure.

FIG. 2 illustrates a detailed example of a circuit configuration of the amplification circuit 161. The amplification circuit 161 includes an integration amplifier 201, a variable amplifier 202, a sample and hold circuit 203, and a buffer amplifier 204. The integration amplifier 201 amplifies a signal that appeared in the signal line 120 and then outputs the result. The control unit 180 can reset the electric potential of the signal line 120 by supplying a control signal φR to a switch element of the integration amplifier 201. The integration amplifier 201 may include, for example, an operational amplifier, an integration capacitor, and a reset switch. The operational amplifier has an inversion input terminal for receiving an electrical signal that is provided via the signal line 120, a noninversion input terminal for receiving a reference voltage Vref from a reference power supply, and an output terminal. The integration capacitor and the reset switch are arranged in parallel between the inversion input terminal and the output terminal. The integration capacitor may have a variable capacitance Cf. The variable amplifier 202 amplifies the electrical signal from the integration amplifier 201.

The output from the variable amplifier 202 can be held by the sample and hold circuit 203. The control unit 180, by supplying a control signal φSH to a switch element of the sample and hold circuit 203, causes the sample and hold circuit 203 to hold the signal. The sample and hold circuit 203 may be configured by, for example, a sampling switch and a sampling capacitor. The sample and hold circuit 203 may be configured by a correlated double sampling circuit. The signal held in the sample and hold circuit 203 is read out by the multiplexer 162 via the buffer amplifier 204.

Figure 3:
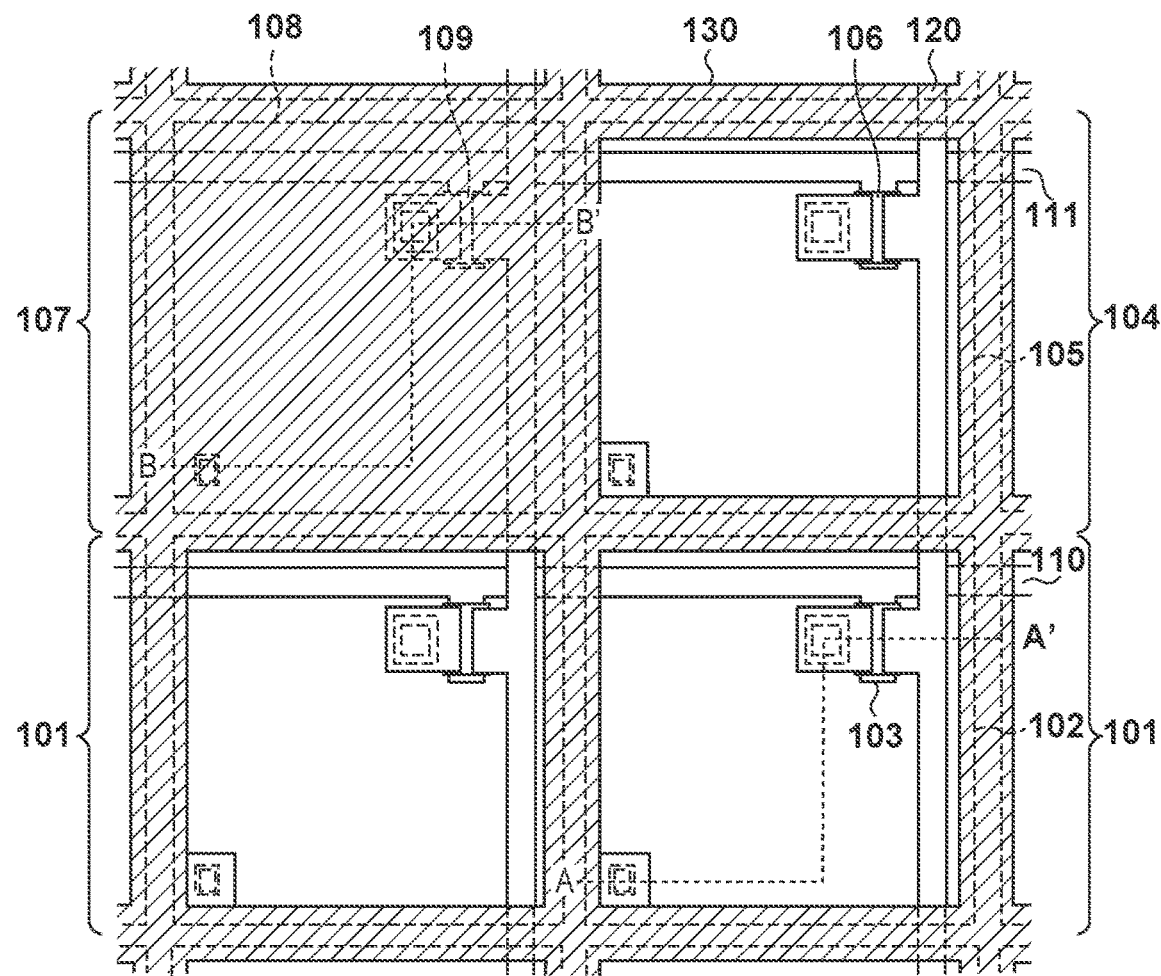
FIG. 3 is a plan view illustrating a configuration of each pixel of the embodiment of the present disclosure.

An example of the structure of pixels of the radiation imaging apparatus 100 will be described with reference to FIG. 3 and FIGS. 4A and 4B. FIG. 3 is a plan view illustrating an arrangement of the imaging pixels 101, the detection pixel 104, and the correction pixel 107 in the radiation imaging apparatus 100. The plan view is equivalent to an orthographic projection on a plane that is parallel to the imaging region IR of the radiation imaging apparatus 100. As indicated by hatching, a metal layer is arranged on the conversion element 108 of the correction pixel 107, and, by this metal layer, the conversion element 108 is light-shielded.

Figure 4A:
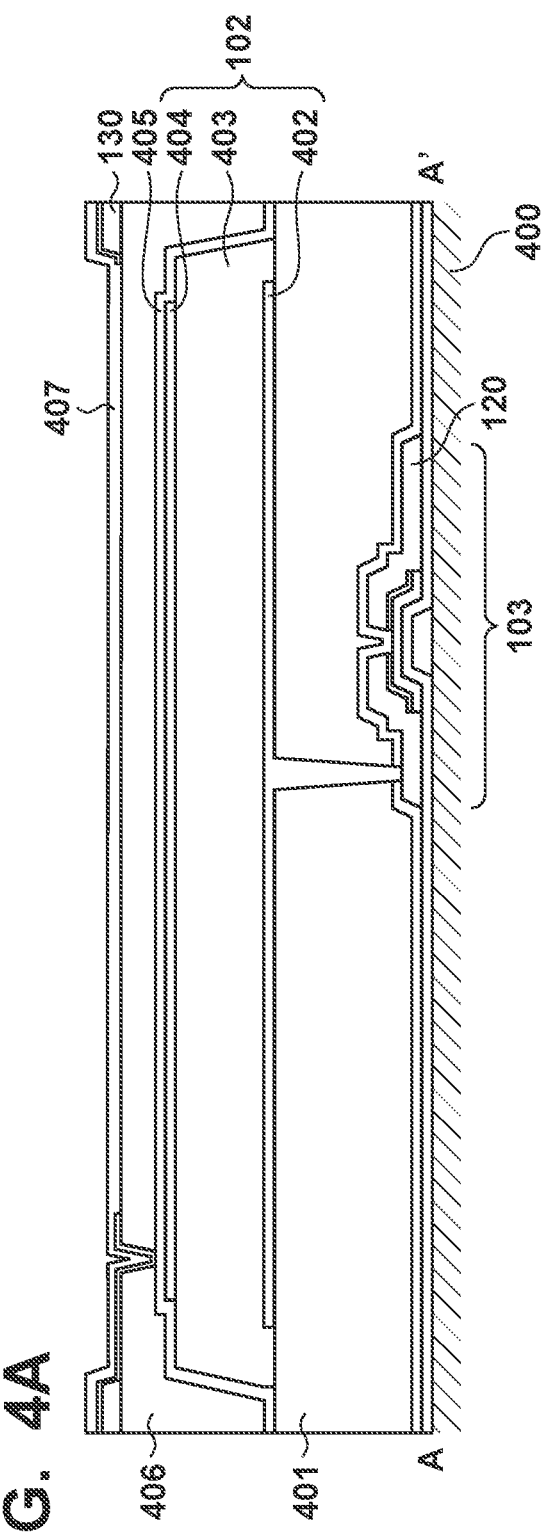
FIGS. 4A and 4B are cross-sectional views illustrating configurations of each pixel of the embodiment of the present disclosure.

FIG. 4A is a cross-sectional view of the imaging pixel 101 along a line A-A' of FIG. 3. The sectional view of the detection pixel 104 is the same as the cross-sectional view of the imaging pixel 101. The switch element 103 is arranged on an insulating support substrate 400 such as a glass substrate. The switch element 103 may be a TFT (thin-film transistor). An interlayer insulation layer 401 is arranged on the switch element 103. The conversion element 102 is arranged on the interlayer insulation layer 401. The conversion element 102 is a photoelectric conversion element capable of converting light into an electrical signal. The conversion element 102 is configured by, for example, an electrode 402, a PIN photodiode 403, and an electrode 404. The conversion element 102 may be configured by an MIS sensor instead of the PIN photodiode.

A protection film 405, an interlayer insulation layer 406, the bias line 130, and a protection film 407 are arranged in order on the conversion element 102. A planarizing film and a scintillator (not shown) are arranged on the protection film 407. The electrode 404 is connected to the bias line 130 via a contact hole. ITO having light transparency is used as a material of the electrode 404 and can transmit light that the scintillator (not shown) converted the radiation into.

Figure 4B:
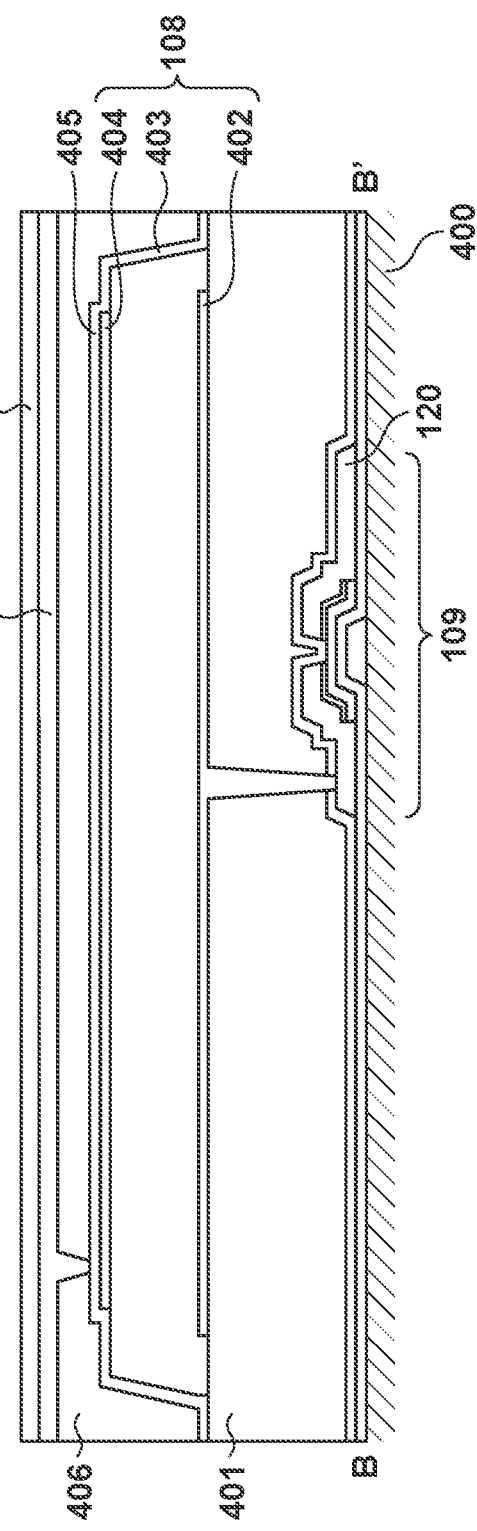

FIG. 4B is a cross-sectional view of the correction pixel 107 along a line B-B' of FIG. 3. The correction pixel 107 is different from the imaging pixel 101 and the detection pixel 104 in that the conversion element 108 is covered by a light-shielding member 408 and may be the same in other points. The light-shielding member 408 is formed by, for example, a metal layer that is on the same layer as that of the bias line 130. The conversion element 108 of the correction pixel 107 is covered by the light-shielding member 408; accordingly, the sensitivity of the correction pixel 107 to radiation is significantly lower than the sensitivity of the imaging pixel 101 and the detection pixel 104. It can also be said that the charge accumulated in the conversion element 108 of the correction pixel 107 is not derived from radiation.

Figure 5:
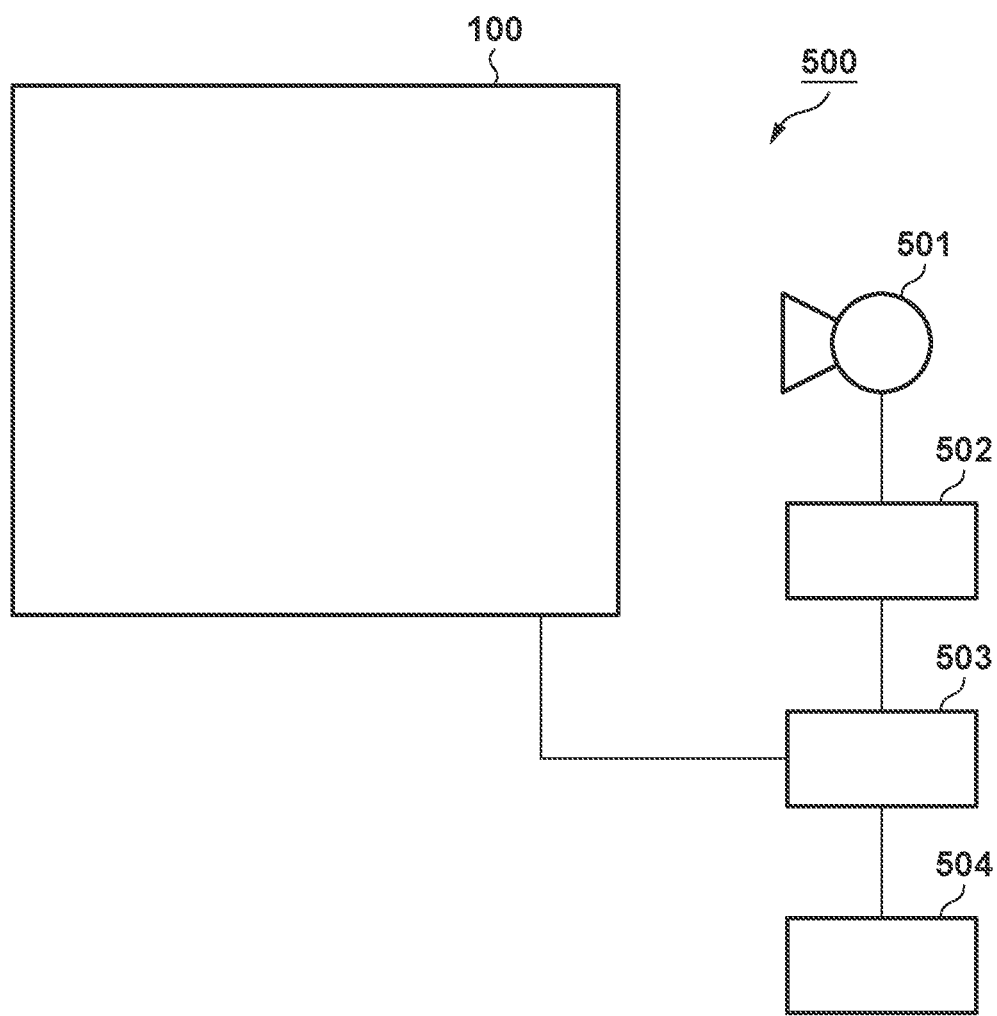
FIG. 5 is a view illustrating an example of a configuration of a radiation imaging system that includes the radiation imaging apparatus of the embodiment of the present disclosure.

FIG. 5 illustrates an example of a configuration of a radiation imaging system 500 that includes the radiation imaging apparatus 100. The radiation imaging system 500 comprises the radiation imaging apparatus 100, a radiation source 501, a radiation source interface 502, a communication interface 503, and a controller 504.

A target dose, the maximum irradiation duration (ms), a tube current (mA), a tube voltage (kV), and a region of interest (ROI), which is a region for which radiation should be monitored, and the like are inputted into the controller 504. When an exposure switch provided in the radiation source 501 is operated, the controller 504 transmits a start request signal to the radiation imaging apparatus 100. The start request signal is a signal for requesting to start radiation irradiation. In response to receiving the start request signal, the radiation imaging apparatus 100 starts preparation for accepting radiation irradiation. The radiation imaging apparatus 100, once preparation for accepting radiation irradiation is completed, transmits a start enable signal to the radiation source interface 502 via the communication interface 503. A start enable signal is a signal for notifying that it is possible to start radiation irradiation. The radiation source interface 502, in response to receiving the start enable signal, causes the radiation source 501 to start radiation irradiation.

The control unit 180 of the radiation imaging apparatus 100, in response to, for example, an integrated value of signals read out from the detection pixels 104 arranged in the region of interest (ROI) reaching a reference dose, sends a trigger signal for stopping irradiation to the communication interface 503. In response to this, the communication interface 503 sends an exposure stop signal to the radiation source interface 502. The radiation source interface 502 that has received the exposure stop signal causes the radiation source 501 to stop radiation irradiation.

The reference dose may be decided by the control unit 180 based on the target dose, radiation irradiation intensity, communication delay between each unit, processing delay, and the like. In a case where a radiation irradiation duration has reached the maximum irradiation duration, the radiation source 501 stops radiation irradiation regardless of whether or not there is an exposure stop signal.

In the present embodiment, the radiation imaging apparatus 100 notifies a trigger signal for stopping irradiation as a result of detecting radiation; however, the method of stopping irradiation is not limited to this. For example, configuration may be such that the radiation imaging apparatus 100 transmits, as a detection result, an integrated value of reached doses and the communication interface 503 or the radiation source interface 502 compares the integrated value to the reference dose and sends a signal for stopping the radiation source 501.

After radiation irradiation is stopped, the radiation imaging apparatus 100 acquires a radiation image by sequentially scanning the driving lines 110 to which only the imaging pixels 101 are connected (the driving lines 110 other than the detection driving lines 111) and reading out an image signal of each imaging pixel 101 using the readout circuit 160. The charge accumulated in the detection pixels 104 is read out during radiation irradiation, and the correction pixels 107 are light-shielded; accordingly, signals from these pixels cannot be used to form a radiation image. Accordingly, the signal processing unit 170 of the radiation imaging apparatus 100, by performing interpolation processing using the pixel values of the imaging pixels 101 around the detection pixels 104 and the correction pixels 107, interpolates the pixel values at the positions of these pixels.

Figure 6:
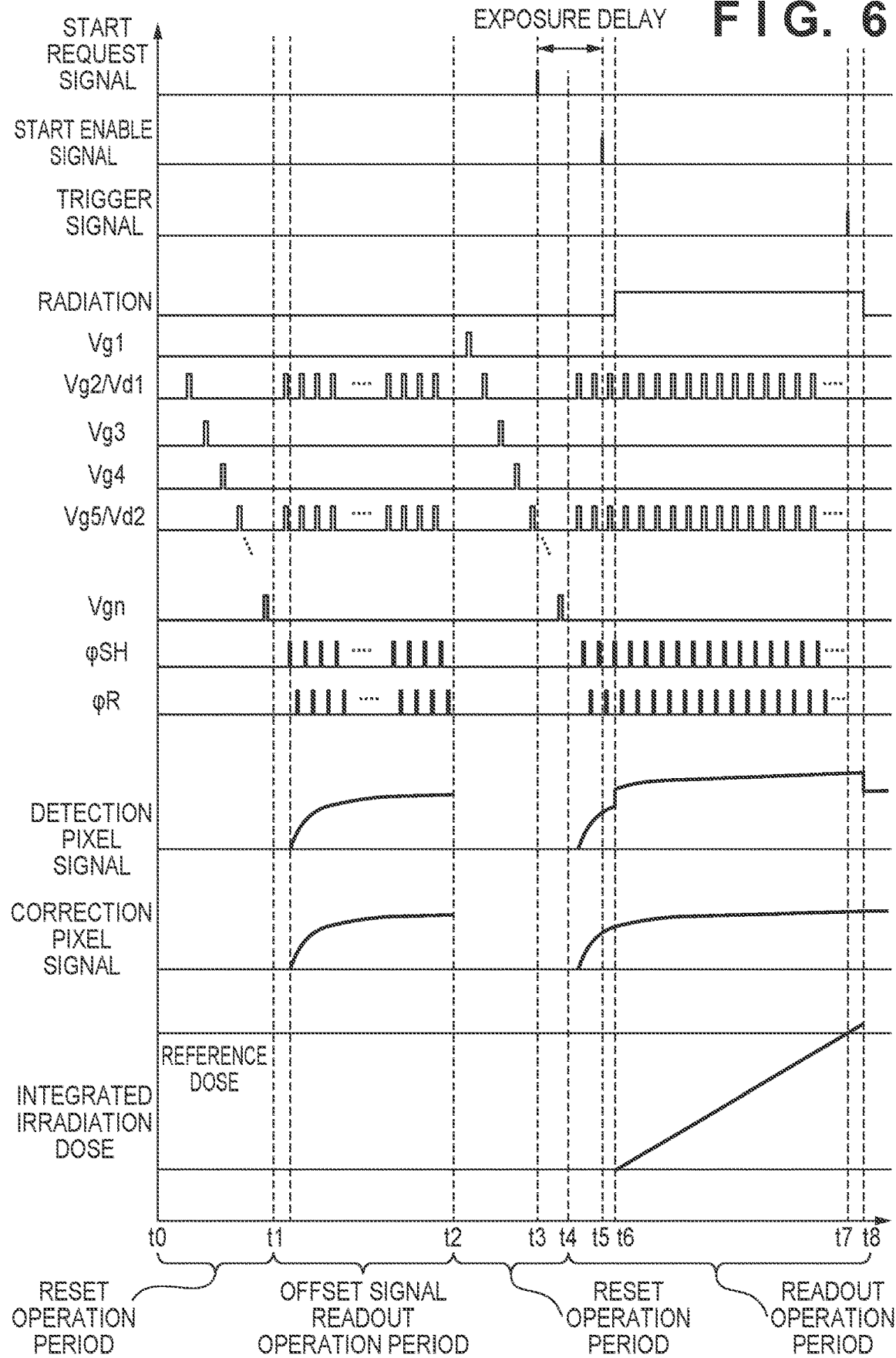
FIG. 6 is a view illustrating operation of the radiation imaging apparatus of the embodiment of the present disclosure.

An example of operation of the radiation imaging apparatus 100 will be described with reference to FIG. 6. This operation is executed by the control unit 180, which controls the driving circuit 150 and the readout circuit 160, and the signal processing unit 170 cooperating. In FIG. 6, "radiation" indicates whether or not radiation is being irradiated on the radiation imaging apparatus 100. When low, radiation is not being irradiated, and when high, radiation is being irradiated. "Vg1" to "Vgn" indicate driving signals that are supplied from the driving circuit 150 to the plurality of driving lines 110. "Vgk" corresponds to the driving line 110 of the k-th row (k=1, . . . , the number of driving lines). As described above, some of the plurality of driving lines 110 are also called the detection driving lines 111. The j-th detection driving line 111 is indicated as "Vdj" (j=1, . . . , the number of detection driving lines). φSH indicates levels of a control signal supplied to the sample and hold circuit 203 of the amplification circuit 161. φR indicates levels of a control signal supplied to the reset switch of the integration amplifier 201. The "detection pixel signal" indicates the value of signals read out from the detection pixels 104. The "correction pixel signal" indicates the value of signals read out from the correction pixels 107. The "integrated irradiation dose" indicates the integrated value of radiation that was irradiated onto the radiation imaging apparatus 100. A method of deciding this integrated value will be described later.

The radiation imaging apparatus 100 starts a reset operation at time t0, and repeats the reset operation. A reset operation is an operation for removing the charge accumulated in the conversion element of each pixel and, more specifically, causes the switch element of each pixel to be in a conductive state by supplying driving signals to the driving lines 110. The control unit 180, by controlling the driving circuit 150, resets each pixel connected to the driving line 110 of the first row. Next, the control unit 180 resets each pixel connected to the driving line 110 of the second row. The control unit 180 repeats this operation up to the driving line 110 of the last row.

At time t1, the radiation imaging apparatus 100 starts an offset signal readout operation. An offset signal readout operation is an operation for reading out, from a pixel, a signal for deciding a correction value (correction value Od and correction value Oc, which will be described later) for performing an offset correction. The control unit 180 repeatedly executes the predetermined number of readout operations for reading out signals from the detection pixels 104 and the correction pixels 107.

In a single readout operation, the driving circuit 150 supplies, at the same time, driving signals to the driving lines 110 connected to at least one of the detection pixel 104 and the correction pixel 107 (i.e., the detection driving lines 111) among the plurality of driving lines 110. By that, signals from the plurality of pixels connected to the same signal line 120 are collectively read out to the readout circuit 160. In the offset signal readout operation, the driving circuit 150 does not supply a driving signal to the driving lines 110 that are not connected to any of the detection pixel 104 and the correction pixel 107 among the plurality of driving lines 110.

After the signals from the pixels are read out to the readout circuit 160, the control unit 180, by temporarily causing the control signal φSH to be at a high level, holds in the sample and hold circuit 203 the signals that were read out to the readout circuit 160 from the pixels via the signal lines 120. The control unit 180 reads out these held signals to the signal processing unit 170 in order of each pixel column using the multiplexer 162. Then, the control unit 180, by temporarily causing the control signal φR to be at a high level, resets the readout circuit 160 (more specifically, the integration amplifier 201 of the amplification circuit 161 thereof). In a case where a region of interest is set within the imaging region IR, the control unit 180 does not need to read out signals from the detection pixels 104 that are not included in this region of interest.

In a case where the predetermined number of times to execute a readout operation is one time, a signal that was read out from an i-th (i=1, . . . , the number of signal lines) signal line 120 in a single readout operation is indicated as a signal value Oi. In a case where the predetermined number of times to execute a readout operation is a plurality of times, an average value of signals that were read out from an i-th signal line 120 in a plurality of readout operations is indicated as the signal value Oi. Other statistic values such as a median value may be used in place of the average value. Other statistic values such as a median value may be used for the average values of other values which will be described below.

The plurality of signal lines 120 are arranged to correspond to the plurality of pixel columns; accordingly, the order (i) of signal lines 120 also indicates the order of pixel columns. Accordingly, this order (i) may also be called a column number in the following. Also, the amplification circuits 161 are respectively connected to the plurality of signal lines 120; accordingly, the order (i) of signal lines 120 also indicates the order of amplification circuits 161. The detection pixels 104 and the correction pixels 107 are exclusively connected to the signal lines 120; accordingly, the readout circuit 160 can separately read out the signals of pixels of different sensitivities. In a case where an i-th pixel column includes at least one detection pixel 104, the signal value Oi is indicated as a signal value Odi. In a case where the i-th pixel column includes at least one correction pixel 107, the signal value Oi is indicated as a signal value Oci.

The signal processing unit 170 decides one correction value Od based on the signal values Odi of the plurality of pixel columns that include the plurality of detection pixels 104 among the plurality of pixel columns. For example, the signal processing unit 170 may decide the correction value Od by averaging the signal values Odi of the plurality of pixel columns. Similarly, the signal processing unit 170 decides one correction value Oc based on the signal values Oci of the plurality of pixel columns that include the plurality of correction pixels 107 among the plurality of pixel columns. For example, the signal processing unit 170 may decide the correction value Oc by averaging the signal values Oci of the plurality of pixel columns. By averaging the signal values of the plurality of pixel columns, it is possible to reduce noise that is included in the signal values. The signal processing unit 170, by storing the thus decided correction values Od and Oc in the storage unit 172, makes it possible to use these in subsequent processing.

The signal processing unit 170, in a case where an ROI is set in the imaging region IR, may average only the signal values of pixel columns that are included in the ROI among the target pixel columns. The signal processing unit 170, in a case where a plurality of ROIs are set, may average the signal values of target pixel columns for each ROI (i.e., one correction value Od and one correction value Oc for each ROI are decided). Furthermore, the signal processing unit 170 may divide one ROI into a plurality of regions and then average the signal values of target pixel columns for each region.

After performing a predetermined number of readout operations, the radiation imaging apparatus 100, at time t2, starts iteration of the reset operation. The control unit 180, upon receiving the radiation irradiation start request signal at time t3, performs the reset operation until the last row and then, from time t4, starts iteration of the readout operation. The readout operation that is performed here may be the same as the readout operation in the offset signal readout operation. Then, the control unit 180, at time t5, transmits the start enable signal. In response to this, at time t6, radiation irradiation is started.

Alternatively, the radiation imaging apparatus 100 may, once the readout operation is transitioned to from the reset operation and then a predetermined period of time (e.g., several ms to several tens of ms) has elapsed, transmit the start enable signal. This makes it possible to prevent readout of a signal during a period immediately after an operation switch in which output variation is large.

From time t6 onward, the control unit 180 starts a decision operation for deciding the radiation dose during irradiation onto the radiation imaging apparatus 100. In the decision operation, the control unit 180 repeatedly executes readout operations for reading out signals from the detection pixels 104 and the correction pixels 107. The repeated readout operations are performed in order to continuously decide the radiation dose at each point in time.

More specifically, in each readout operation, the driving circuit 150 supplies, at the same time (i.e., at the same timing), driving signals to the driving lines 110 connected to at least one of the detection pixel 104 and the correction pixel 107 (i.e., the detection driving lines 111) among the plurality of driving lines 110. By that, signals from the plurality of pixels connected to the same signal line 120 are collectively read out to the readout circuit 160. In the offset signal readout operation, the driving circuit 150 does not supply a driving signal to the driving lines 110 that are not connected to any of the detection pixel 104 and the correction pixel 107 among the plurality of driving lines 110.

After the signals from the pixels are read out to the readout circuit 160, the control unit 180, by temporarily causing the control signal φSH to be at a high level, holds in the sample and hold circuit 203 the signals that were read out to the readout circuit 160 from the pixels via the signal lines 120. The control unit 180 reads out these held signals into the signal processing unit 170 in order of each pixel column using the multiplexer 162. Then, the control unit 180, by temporarily causing the control signal φR to be at a high level, resets the readout circuit 160 (more specifically, the integration amplifier 201 of the amplification circuit 161 thereof). In a case where a region of interest is set within the imaging region IR, the control unit 180 does not need to read out signals from the detection pixels 104 that are not included in this region of interest.

The signal that was read out from the i-th (i=1, . . . , the number of signal lines) signal line 120 in the readout operation is indicated as a signal value Si. In a case where the i-th pixel column includes at least one detection pixel 104, the signal value Si is indicated as a signal value Sdi. In a case where the i-th pixel column includes at least one correction pixel 107, the signal value Si is indicated as a signal value Sci.

The signal processing unit 170 decides one signal value Sd based on the signal values Sdi of the plurality of pixel columns that include the plurality of detection pixels 104 among the plurality of pixel columns. For example, the signal processing unit 170 may decide the signal value Sd by averaging the signal values Sdi of the plurality of pixel columns. The signal value Sd changes in accordance with the radiation dose. Similarly, the signal processing unit 170 decides one signal value Sc based on the signal values Sci of the plurality of pixel columns that include the plurality of correction pixels 107 among the plurality of pixel columns. For example, the signal processing unit 170 may decide the signal value Sc by averaging the signal values Sci of the plurality of pixel columns. The signal value Sc is mostly unaffected by radiation.

The signal processing unit 170, in a case where an ROI is set in the imaging region IR, may average the signal values of pixel columns that are included in the ROI among the target pixel columns. The signal processing unit 170, in a case where a plurality of ROIs are set, may average the signal values of target pixel columns for each ROI (i.e., one correction value Od and one correction value Oc for each ROI are decided). Furthermore, the signal processing unit 170 may divide one ROI into a plurality of regions and then average the signal values of target pixel columns for each region.

Then, the signal processing unit 170, by applying the signal value Sd, the signal value Sc, the correction value Od, and the correction value Oc in the following Expression (1), calculates the irradiation dose DOSE.

$$DOSE=(Sd-Od)-(Sc-Oc) \quad \text{Expression (1)}$$

In this expression, the signal value Sd, which has the radiation component, is corrected using the signal value Sc, the correction value Od, and the correction value Oc.

The signal processing unit 170, by applying the signal value Sd, the signal value Sc, the correction value Od, and the correction value Oc in the following Expression (2) in place of Expression (1), may calculate DOSE.

$$DOSE=Sd-Od \times Sc/Oc \quad \text{Expression (2)}$$

Also in this expression, the signal value Sd, which has the radiation component, is corrected using the signal value Sc, the correction value Od, and the correction value Oc.

The signals that are read out from the detection pixels 104 may change with the temperature environment and the like or, as illustrated in FIG. 6, may significantly change immediately after the reset operation is ended (immediately after time t4) and then stabilize with passing of time (e.g., approximately 100 ms). Accordingly, it is not possible to sufficiently remove the offset amount by calculating DOSE using only the signal value Sd, which is obtained from the detection pixels 104, and the correction value Od.

In the present embodiment, the irradiation dose DOSE is decided by further using the signal value Sc and the correction value Oc, which were read out from the correction pixels 107. The correction pixels 107 are extremely low in sensitivity to radiation; accordingly, the value Sc of the signals, which is read out from the correction pixels 107 after the start of radiation irradiation, can be considered to indicate an offset component of the signal value Sd, which is read out from the detection pixels 104. Furthermore, in this embodiment, the irradiation dose DOSE is decided using the correction values Od and Oc based on the signals read out from the detection pixels 104 and the correction pixels 107 before the start of radiation irradiation. Therefore, differences (a difference in channel of a detection circuit, differences in parasitic resistance and parasitic capacitance of each pixel, and the like) in characteristics unique to each pixel can be corrected.

When the integrated irradiation dose reaches the reference dose at time t7, the control unit 180 transmits a trigger signal for stopping radiation. In response to this, at time t8, radiation irradiation is stopped.

The correction value Od and the correction value Oc may change with the temperature environment of the sensor and the like. Accordingly, the radiation imaging apparatus 100 may periodically (e.g., at each activation of the radiation imaging apparatus 100) update the correction value Od and the correction value Oc. In the example of FIG. 6, the radiation imaging apparatus 100 decides the correction value Od and the correction value Oc before the reception of the radiation irradiation start request signal. Alternatively, the radiation imaging apparatus 100 may decide the correction value Od and the correction value Oc after the reception of the radiation irradiation start request signal. In such a case, the control unit 180 transmits the start enable signal to the radiation source interface 502 after deciding the correction value Od and the correction value Oc, and radiation irradiation is started in response to this. The decision of the correction value Od and the correction value Oc may be performed at any point in time so long as it is before the start of radiation irradiation. For example, the correction value Od and the correction value Oc may be decided and then stored at the time of production or shipment of the radiation imaging apparatus 100, at the time of installation of the radiation imaging apparatus 100 at the facility of use, or at the time of activation of the radiation imaging apparatus 100 before use.

Specific examples of arrangement of the detection pixels 104 and the correction pixels 107 will be described with reference to FIG. 7 and FIG. 8. In these drawings, in order to clarify the arrangement of the detection pixels 104 and the correction pixels 107, the imaging pixels 101 will be omitted. Also, among the configuration elements of the readout circuit 160, the integration amplifiers 201, the sample and hold circuits 203, and the multiplexers 162 will be illustrated and other configuration elements will be omitted.

Figure 7:
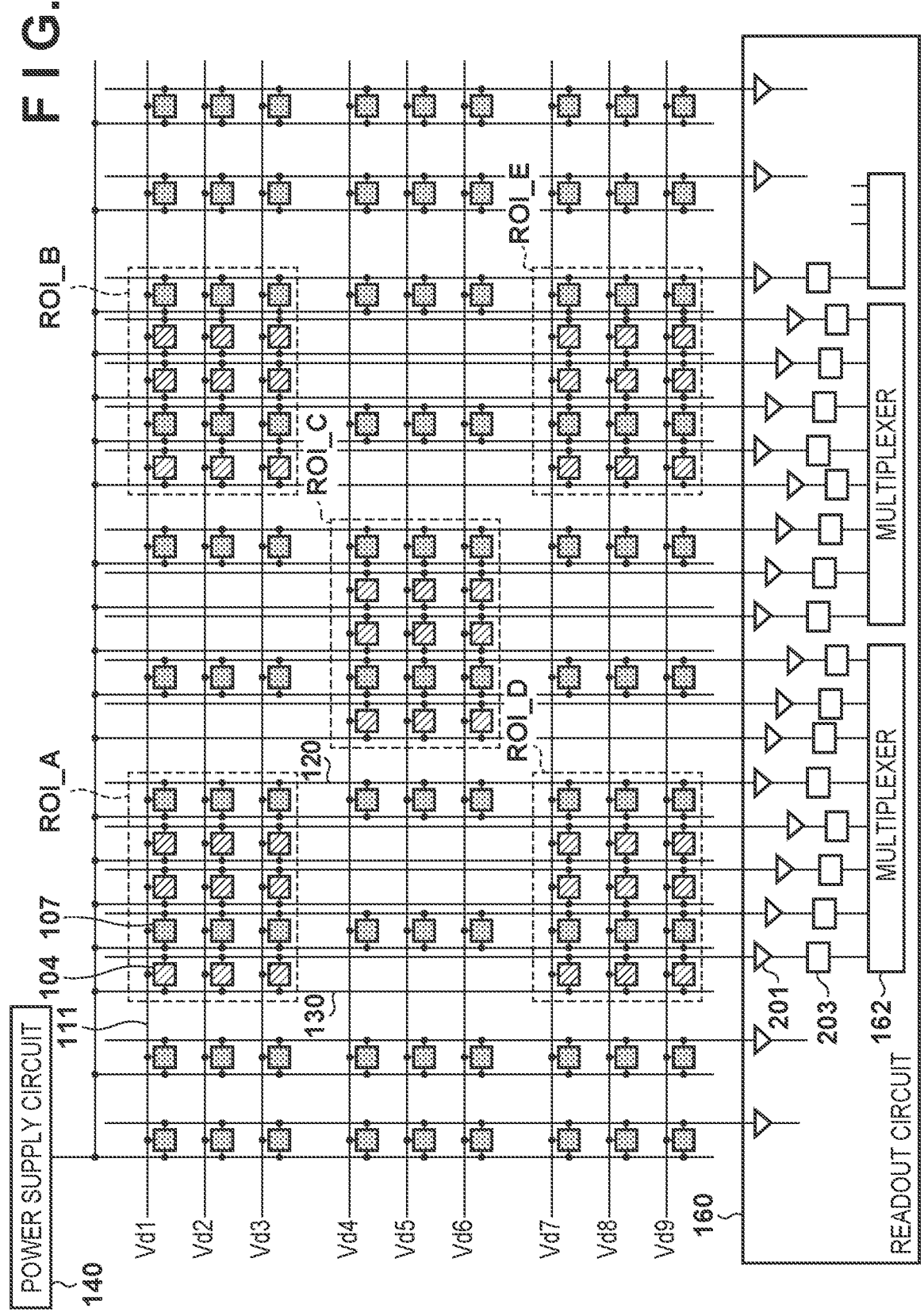
FIG. 7 is a view illustrating the positions of detection pixels and correction pixels of the embodiment of the present disclosure.

In the example of FIG. 7, regions of interest ROI_A to ROI_E are set in the portions of the imaging region IR. In the example of FIG. 8, regions of interest ROI_A and ROI_B are set in the portions of the imaging region IR. The regions of interest are regions that are to be monitored by AEC, and the detection pixels 104 are arranged in each of these regions of interest. One region of interest may be a rectangular (includes a square) region between several centimeters to several tens of centimeters. Each of the width and height of one region of interest may include approximately several hundreds to a thousand and several hundreds of pixels.

Figure 8:
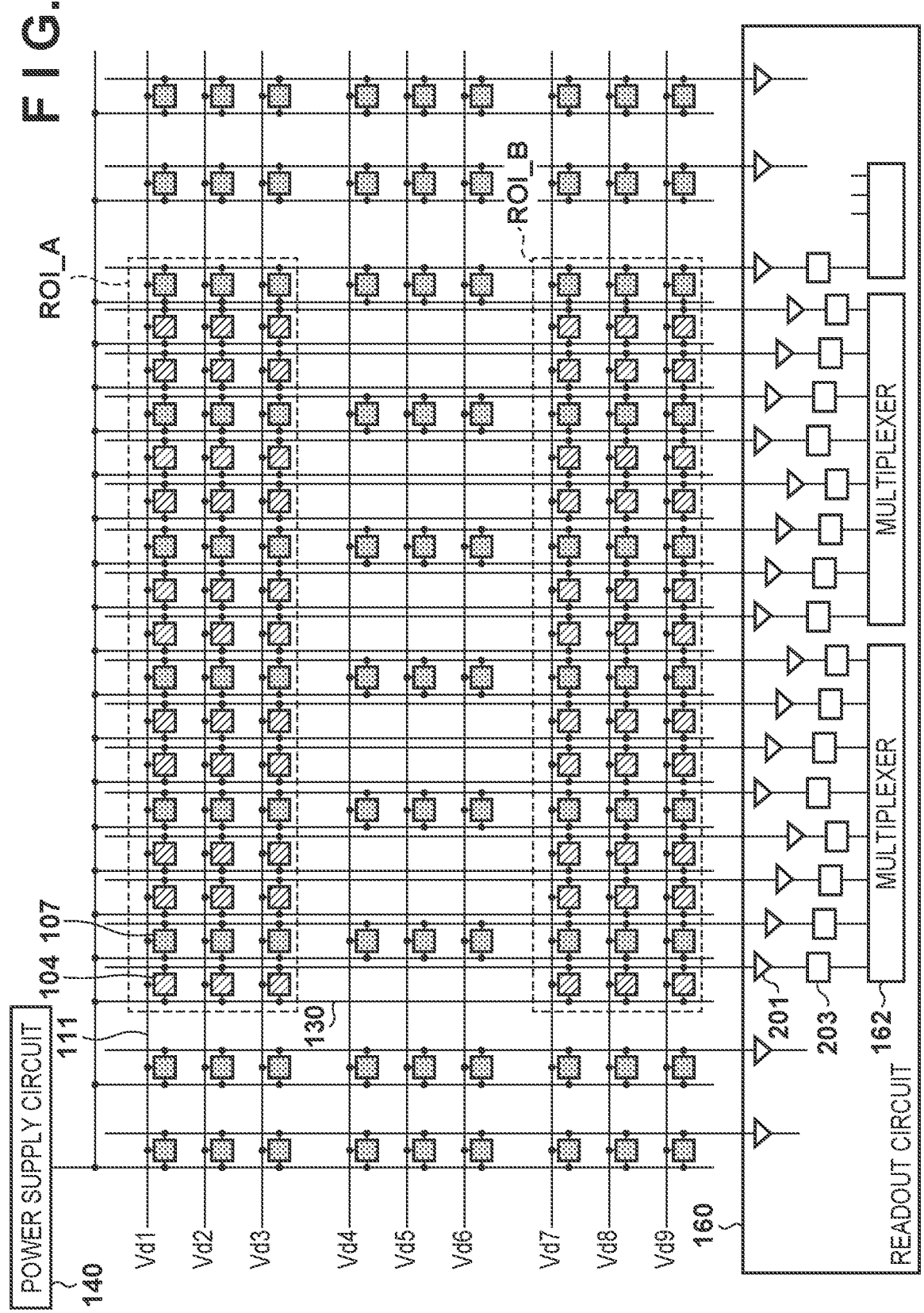
FIG. 8 is a view illustrating the positions of detection pixels and correction pixels of the embodiment of the present disclosure.

In the examples of FIG. 7 and FIG. 8, the detection pixels 104 are arranged only within the regions of interest and are not arranged in regions other than that. Meanwhile, the correction pixels 107 are arranged both within the regions of interest and in regions other than that. Alternatively, the detection pixels 104 and the correction pixels 107 may only be arranged within the regions of interest and does not need to be arranged in regions other than that.

As described above, the detection pixels 104 and the correction pixels 107 are exclusively connected to the signal lines 120. In other words, the detection pixels 104 are included in pixel columns that do not include the correction pixels 107 among the plurality of pixel columns arranged in the imaging region IR. Also, the plurality of pixel columns arranged in the imaging region IR include a pixel column that includes one or more of the plurality of detection pixels 104 and does not include any of the plurality of correction pixels 107.

As illustrated in FIG. 7 and FIG. 8, the internal structure of the readout circuit 160 is periodic. More specifically, the circuit pattern of the plurality of integration amplifiers 201 of the readout circuit 160 changes at regular intervals. In the example in the drawing, the relative positions (e.g., distance) of integration amplifiers 201 with respect to the multiplexer 162 changes on a 4-unit basis (4-channel basis). In other words, the circuit pattern of the plurality of integration amplifiers 201 has a periodicity of 4 periods. Accordingly, the period of the readout circuit 160 may be considered to be 4, which is the same as the circuit pattern of the plurality of integration amplifiers 201.

Also, as illustrated in FIG. 7 and FIG. 8, the circuit pattern of the plurality of sample and hold circuits 203 of the readout circuit 160 changes periodically. In the example in the drawing, the relative positions (e.g., distance) of sample and hold circuits 203 with respect to the multiplexer 162 changes on a 4-unit basis (4-channel basis). In other words, the circuit pattern of the plurality of sample and hold circuits 203 has a periodicity of 4 periods. Accordingly, the period of the readout circuit 160 may be considered to be 4, which is the same as the circuit pattern of the plurality of sample and hold circuits 203.

Furthermore, as illustrated in FIG. 7 and FIG. 8, outputs (in the examples in the drawings, 8 outputs) from the plurality of integration amplifiers 201 are supplied to one multiplexer 162. The multiplexers 162 may also have unique characteristics. Accordingly, the period of the readout circuit 160 may be considered to be 8, which is the same as the number of integration amplifiers 201 that supply outputs to one multiplexer 162.

The period of the readout circuit may be decided based on only the circuit pattern of the plurality of integration amplifiers 201. In such a case, in the above-described example, the period of the readout circuit is 4. The period of the readout circuit may be decided based on only the circuit pattern of the plurality of sample and hold circuits 203. In such a case, in the above-described example, the period of the readout circuit is 4. The period of the readout circuit may be decided based on only the number of integration amplifiers 201 that supply outputs to one multiplexer 162. In such a case, in the above-described example, the period of the readout circuit is 8. The period of the readout circuit may be decided based on these plurality of elements. For example, the period of the readout circuit may be the maximum common divisor of the period of these plurality of elements. In the above-described example, the period of the circuit pattern of the plurality of integration amplifiers 201 is 4, the period of the circuit pattern of the plurality of sample and hold circuits 203 is 4, and the number of integration amplifiers 201 that supply outputs to one multiplexer 162 is 8. Accordingly, 4, which is the maximum common divisor of these, may be considered as the period of the readout circuit.

In the examples of FIG. 7 and FIG. 8, cases where the period of the readout circuit 160 is 4 are described; however, the period of the readout circuit 160 may be another value that is 2 or higher. For example, the period of the readout circuit 160 may be another power of 2 that is other than 4 or may be another value.

In accordance with the periodicity of the internal structure of the readout circuit 160, the characteristic (e.g., the amount of change in the offset level of each amplification circuit 161 related to the temperature change) of the readout circuit 160 may also have a periodicity. It is thought that this is due to the variability in parasitic capacitance/parasitic resistance and the like of the circuits.

As described above, in Expression (1) and Expression (2), the signal value Sd is corrected based on the correction value Oc. The correction value Oc is decided based on (e.g., in accordance with the average of) the plurality of signal values Oci read out from the plurality of pixel columns that include the correction pixels 107. In a case where the pixel columns that include the plurality of correction pixels 107 have the same period as the period of the readout circuit 160, the correction value Oc ends up being decided based on the signal values Oci from channels that have the same characteristic (i.e., channels in which the value of the column number divided by the period is the same). Accordingly, the characteristic of the readout of the signal values Oci becomes distorted and the accuracy of correction of the signal value Sd decreases.

Accordingly, in some embodiments, the plurality of correction pixels 107 are arranged such that there are two or more types of remainder of the column number of the pixel column that includes the plurality of correction pixels 107 divided by the period of the readout circuit 160. By arranging as such, the correction value Oc is decided based on the signal values Oci of channels with two or more types of characteristic; accordingly, the accuracy of correction of the signal value Sd is improved. Furthermore, the plurality of correction pixels 107 may be arranged such that the remainder of the column number of the pixel column that includes the plurality of correction pixels 107 divided by the period of the readout circuit 160 is the same number of types as the period of the readout circuit 160. By this, the correction value Oc is decided based on the signal values Oci of channels of all characteristics; accordingly, the accuracy of correction of the signal value Sd is improved.

The pixel columns that include the correction pixels 107 may be periodically or randomly arranged among the plurality of pixel columns that constitutes the imaging region IR. In the example of FIG. 8, the pixel columns that include the correction pixels 107 are arranged such that the period is 3. Accordingly, there will be four types (0, 1, 2, or 3) of remainder of the column number of the pixel column that includes the plurality of correction pixels 107 divided by the period of the readout circuit 160, which is 4. In this example, the period of the readout circuit 160 (4 in the example of FIG. 8) and the period of the column number of the pixel column that includes the correction pixels 107 (3 in the example of FIG. 8) are coprime. In such a case, the remainder of the column number of the pixel column that includes the plurality of correction pixels 107 divided by the period of the readout circuit 160 is the same number of types as the period of the readout circuit 160. The column number of the pixel column that includes the plurality of correction pixels 107 may be a value other than 3 and may be, for example, another odd number or another value.

FIGS. 9A and 9B illustrate a periodic change in the characteristic of the readout circuit 160 illustrated in FIG. 8. In FIG. 9A and FIG. 9B, the horizontal axes are the column number and the vertical axes indicate the temperature characteristic of the amplification circuit 161 corresponding to each column number. As illustrated in FIG. 9A and FIG. 9B, the temperature characteristic has a periodicity in which the period is 4. FIG. 9A, as a comparative example, illustrates a case where the correction pixels 107 are arranged in a period of 4. In such a case, only the channels with one type of temperature characteristic is used; accordingly, the characteristic of the signal values Oci used to decide the correction value Oc becomes skewed. Meanwhile, FIG. 9B illustrates a case where the correction pixels 107 are arranged in a period of 3 as in FIG. 8. In such a case, the channels of all types of temperature characteristic is used; accordingly, the characteristic of the signal values Oci used to decide the correction value Oc does not become skewed.

In the above-described embodiment, an example in which the signal value Sd obtained from the detection pixels 104 is corrected using the correction value Oc obtained from the correction pixels 107 was described. The above-described embodiment may be used for correction other than that. For example, after time t8 of FIG. 6, the correction value Oc obtained from the correction pixels 107 may be used to correct the signal value obtained from the imaging pixels 101. In such a case, the imaging pixels 101 may be included in the same pixel column as the correction pixels 107.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2020-117931, filed Jul. 8, 2020, which is hereby incorporated by reference herein in its entirety.

What is claimed is:

1. A radiation imaging apparatus comprising:
a plurality of pixels arranged to form a plurality of pixel rows and a plurality of pixel columns, the plurality of pixels including a plurality of first pixels and a plurality of second pixels whose sensitivity to radiation is lower than the plurality of first pixels;
a plurality of signal lines arranged to correspond to the plurality of pixel columns;
a readout circuit configured to read out a signal from the plurality of pixels via the plurality of signal lines; and
a processing unit configured to decide a correction value using a plurality of signals read out from the plurality of second pixels and correct a plurality of signals read out from the plurality of first pixels using the correction value, wherein
an internal structure of the readout circuit has a period, and
the plurality of second pixels are arranged such that there are two or more types of remainders of column numbers of pixel columns that include the plurality of second pixels divided by the period.

2. The radiation imaging apparatus according to claim 1, wherein the plurality of pixel columns includes a pixel column that includes one or more of the plurality of first pixels and does not include any of the plurality of second pixels.

3. The radiation imaging apparatus according to claim 1, wherein the plurality of first pixels is included in one or more pixel columns in the plurality of pixel columns that do not include any of the plurality of second pixels.

4. The radiation imaging apparatus according to claim 1, wherein the plurality of second pixels are arranged such that the number of types of remainders of column numbers of pixel columns that include the plurality of second pixels divided by the period is equal to the period.

5. The radiation imaging apparatus according to claim 1, wherein column numbers of pixel columns that include the plurality of second pixels has a period.

6. The radiation imaging apparatus according to claim 5, wherein the period of the readout circuit and the period of column numbers of pixel columns that include the plurality of second pixels are coprime.

7. The radiation imaging apparatus according to claim 1, wherein the readout circuit includes a plurality of amplifiers that amplify a signal from the plurality of signal lines, and the period of the readout circuit is based on a circuit pattern of the plurality of amplifiers.

8. The radiation imaging apparatus according to claim 1, wherein the readout circuit has a plurality of sample and hold circuits that hold a signal from the plurality of signal lines, and the period of the readout circuit is based on a circuit pattern of the plurality of sample and hold circuits.

9. The radiation imaging apparatus according to claim 1, wherein the readout circuit includes a plurality of amplifiers that amplify a signal from the plurality of signal lines, and one or more multiplexers to which an output of the plurality of amplifiers is supplied, and the period of the readout circuit is based on the number of amplifiers that supply an output to one multiplexer.

10. The radiation imaging apparatus according to claim 1, wherein the processing unit decides a radiation dose during irradiation onto the radiation imaging apparatus based on the plurality of signals read out from the plurality of first pixels and corrected using the correction value.

* * * * *